US011363147B2

(12) United States Patent
Adams

(10) Patent No.: US 11,363,147 B2
(45) Date of Patent: Jun. 14, 2022

(54) RECEIVE-PATH SIGNAL GAIN OPERATIONS

(71) Applicant: Sorenson IP Holdings, LLC, Salt Lake City, UT (US)

(72) Inventor: Mark Adams, Lehi, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 883 days.

(21) Appl. No.: 16/141,446

(22) Filed: Sep. 25, 2018

(65) Prior Publication Data

US 2020/0099793 A1   Mar. 26, 2020

(51) Int. Cl.
*H04M 9/08* (2006.01)
*H04M 9/10* (2006.01)
(Continued)

(52) U.S. Cl.
CPC ......... *H04M 9/087* (2013.01); *G10L 21/0232* (2013.01); *H04M 9/082* (2013.01);
(Continued)

(58) Field of Classification Search
CPC ........ H04M 9/087; H04M 9/10; H04M 9/082; H04M 2201/40; H04M 9/08;
(Continued)

(56) References Cited

U.S. PATENT DOCUMENTS 4,165,449 A    8/1979  Vachon
5,737,719 A    4/1998  Terry
(Continued)

FOREIGN PATENT DOCUMENTS

CN    106448691 A    2/2017
JP    2007336364 A   12/2007
(Continued)

OTHER PUBLICATIONS

William Andrew Burnson and Wenjia Zhou, Real-Time Voice Conversion: A Multirate 8kHz LPC Vocoder, ECE 420: Digital Signal Processing II, May 5, 2011, University of Illinois.
(Continued)

*Primary Examiner* — Lisa Hashem
(74) *Attorney, Agent, or Firm* — Maschoff Brennan

(57) ABSTRACT

Operations related to performing gain operations with respect to a receive-path signal of a first device may be performed. The operations may include obtaining the receive-path signal, which includes an echo speech signal and a receive speech signal originating at a second device. In addition, the operations may include identifying a portion of the receive-path signal that includes, at a particular time, a first frequency component that corresponds to the echo speech signal and a second frequency component that corresponds to the receive speech signal in which the first frequency component is different from the second frequency component. Moreover, the operations may include attenuating the first frequency component of the portion while avoiding attenuating the second frequency component of the portion based on the first frequency component corresponding to the echo speech signal and the second frequency component corresponding to the receive speech signal.

20 Claims, 4 Drawing Sheets

(51) Int. Cl.
  *G10L 21/0232* (2013.01)
  *G10L 21/0208* (2013.01)
(52) U.S. Cl.
  CPC ..... *H04M 9/10* (2013.01); *G10L 2021/02082* (2013.01); *H04M 2201/40* (2013.01)
(58) Field of Classification Search
  CPC ....... G10L 21/0232; G10L 2021/02082; G10L 21/0208
  See application file for complete search history.

(56) References Cited

U.S. PATENT DOCUMENTS

| | | | |
|---|---|---|---|
| 6,999,582 | B1 | 2/2006 | Popovic et al. |
| 7,856,098 | B1 | 12/2010 | Rossello |
| 8,015,002 | B2 * | 9/2011 | Li ................. G10L 21/0208 704/226 |
| 9,344,107 | B1 * | 5/2016 | Morche ................. H03M 3/368 |
| 9,917,628 | B2 * | 3/2018 | Liang ................. H04B 7/0452 |
| 10,553,236 | B1 * | 2/2020 | Ayrapetian ............. G10L 25/84 |
| 10,797,776 | B2 * | 10/2020 | Liang ................. H04L 25/0202 |
| 11,012,136 | B2 * | 5/2021 | Liang ................. H04B 7/15507 |
| 11,012,269 | B2 * | 5/2021 | Shulman ............. H04L 27/0002 |
| 2002/0142811 | A1 | 10/2002 | Gupta et al. |
| 2004/0247111 | A1 | 12/2004 | Popovic et al. |
| 2005/0114119 | A1 | 5/2005 | Oh et al. |
| 2006/0018460 | A1 | 1/2006 | McCree |
| 2006/0136199 | A1 | 6/2006 | Nongpiur et al. |
| 2008/0069016 | A1 | 3/2008 | Cao et al. |
| 2011/0058667 | A1 | 3/2011 | Takada |
| 2011/0153318 | A1 | 6/2011 | Rossello et al. |
| 2012/0116755 | A1 | 5/2012 | Park |
| 2013/0044873 | A1 | 2/2013 | Etter |
| 2013/0053094 | A1 | 2/2013 | Inagaki |
| 2013/0195302 | A1 | 8/2013 | Meincke et al. |
| 2014/0200884 | A1 | 7/2014 | McArthur et al. |
| 2016/0035370 | A1 | 2/2016 | Krini et al. |
| 2016/0163334 | A1 | 6/2016 | Suzuki et al. |
| 2016/0189707 | A1 | 6/2016 | Donjon et al. |
| 2017/0310360 | A1 * | 10/2017 | Gejo ...................... H04B 7/015 |
| 2018/0077290 | A1 * | 3/2018 | Zargar ................... G10L 25/84 |
| 2018/0350378 | A1 * | 12/2018 | Bullough ............ G10L 21/0208 |
| 2018/0350382 | A1 * | 12/2018 | Bullough ............ G10L 21/0232 |

FOREIGN PATENT DOCUMENTS

| | | |
|---|---|---|
| JP | 2011172165 A | 9/2011 |
| JP | 2014174255 A | 9/2014 |
| WO | 2014194273 A2 | 4/2014 |

OTHER PUBLICATIONS

Jong Han Joo, Jung Hoon Lee, Young Sun Kim, Seung Ho Choi, and Se Jin Chang, Acoustic Echo Cancellation Techniques for Far-End Telephony Speech Recognition in Barge-In Situations, Aug. 7, 2014, Contemporary Engineering Sciences, vol. 7, Seoul National University of Science and Technology, Korea.

* cited by examiner

RECEIVE-PATH SIGNAL GAIN OPERATIONS

FIELD

The embodiments discussed in the present disclosure are related to gain operations performed with respect to signals traversing a receive path of an electronic device.

BACKGROUND

During communication sessions between communication devices, a receive path of one of the communication devices may have an audio signal traversing thereon that originates from the other communication device. Additionally or alternatively, the receive path of the communication device may have an echo audio signal traversing on the receive path in which the echo audio signal is a reflection of an audio signal transmitted by the communication device to the other communication device.

The subject matter claimed herein is not limited to embodiments that solve any disadvantages or that operate only in environments such as those described above. Rather, this background is only provided to illustrate one example technology area where some embodiments described herein may be practiced.

SUMMARY

According to one or more aspects of the present disclosure, operations related to performing gain operations with respect to a receive-path signal of a first device may be performed. The operations may include obtaining a transmit speech signal generated by the first device during a communication session between the first device and a second device. The operations may further include obtaining the receive-path signal, which includes an echo speech signal of the transmit speech signal and a receive speech signal originating at the second device during the communication session. In addition, the operations may include identifying a portion of the receive-path signal that includes, at a particular time, a first frequency component that corresponds to the echo speech signal and a second frequency component that corresponds to the receive speech signal in which the first frequency component is different from the second frequency component. Moreover, the operations may include attenuating the first frequency component of the portion while avoiding attenuating the second frequency component of the portion based on the first frequency component corresponding to the echo speech signal and the second frequency component corresponding to the receive speech signal.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
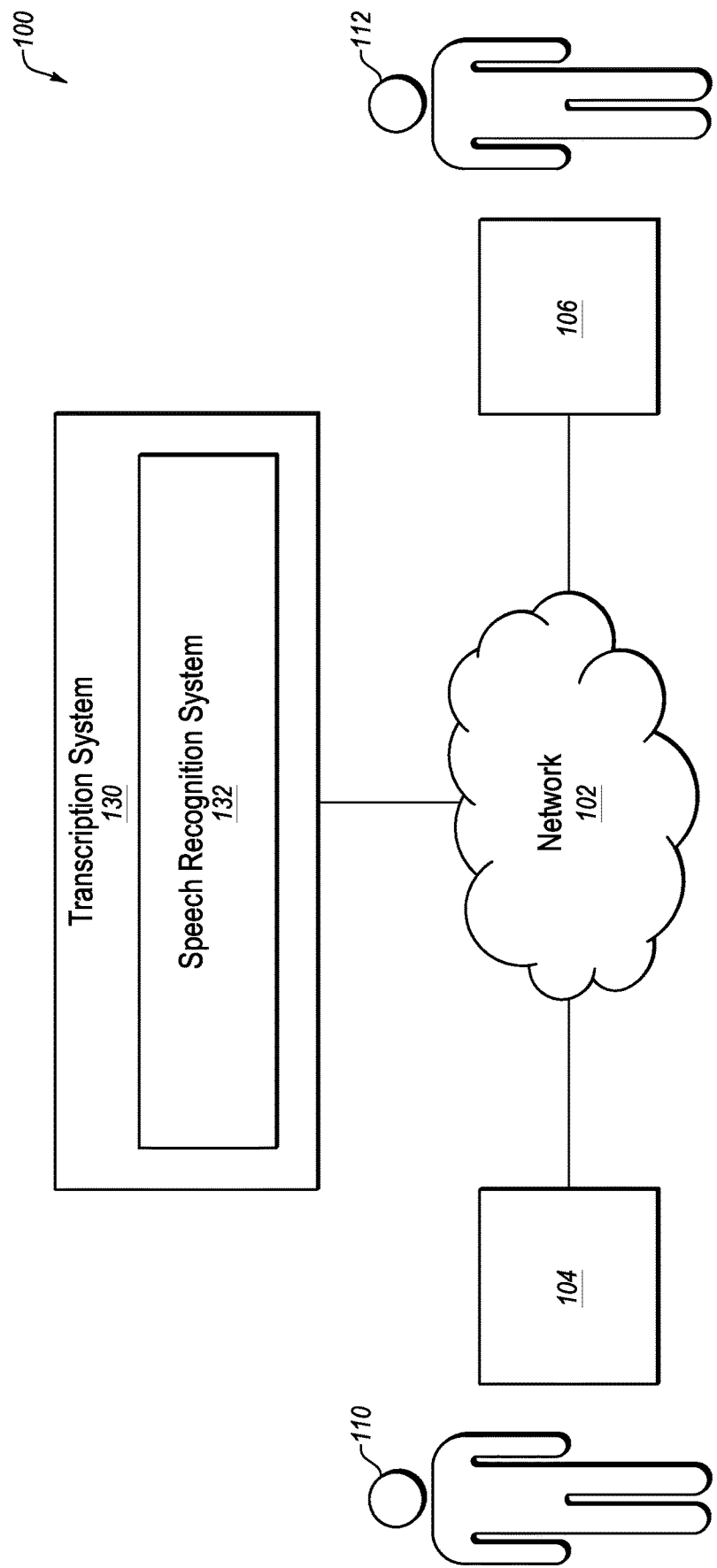
FIG. 1 illustrates an example environment for conducting communication sessions.

Some embodiments in this disclosure relate to systems and methods that may be configured to perform gain operations on signals that may traverse a receive path of a communication device. For example, a communication session between a first device and a second device may correspond to an interaction between a first person and a second person. During the communication session, the first device may obtain first audio of the first person and the second device may obtain second audio of the second person. In some instances, the first device may be configured to generate and transmit a transmit audio signal that includes the first audio and that is intended for the second device.

Additionally or alternatively, the first device may be configured to present audio (e.g., via a speaker) based on a receive-path signal on a receive path of the first device. For example, during the communication session, the first device may receive, at the receive path, a receive audio signal that includes the second audio from the second device such that the receive-path signal may include the receive audio signal. In these or other embodiments, the first device may be configured to present the second audio based on the receive-path signal including the receive audio signal. Alternatively or additionally, at least a portion of the transmit audio signal may be reflected onto the receive path as an echo audio signal. As such, the receive-path signal on the receive path may include the echo audio signal. Some embodiments of the present disclosure may relate to performing gain operations with respect to the echo audio signal to reduce or eliminate presentation of at least a portion of the echo audio signal.

Additionally or alternatively, in some instances a double-talk situation may occur in which both the first person and the second person may be speaking at the same time or substantially the same time. During double-talk situations, the receive-path signal may include the receive audio signal and the echo audio signal. As described in further detail below, systems and methods of the present disclosure may relate to performing gain operations with respect to the receive-path signal in a manner that may reduce the echo audio signal included in the receive-path signal while also limiting adversely affecting the receive audio signal included in the receive-path signal. As discussed in further detail below, in these or other embodiments, the gain operations may be based on whether the echo audio signal corresponds to voiced speech or unvoiced speech.

In the present disclosure, "voiced speech" may refer to any speech that uses vocal cords to produce the sounds. Additionally, "unvoiced speech" may refer to speech that does not use vocal cords to produce the sounds such as speech that is produced by the lips, tongue, and/or mouth without the use of vocal cords.

In these or other embodiments, one or more gain operations may be performed with respect to the receive-path signal in a manner that may amplify the receive audio signal, which may increase the amplitude of the presented second audio. Additionally or alternatively, during double-talk situations, one or more gain operations may be performed with respect to the receive-path signal in a manner that may amplify the receive audio signal while also limiting amplification of the echo audio signal. As discussed in further detail below, in these or other embodiments, the gain operations may be based on whether the receive audio signal corresponds to voiced speech or unvoiced speech.

One or more embodiments of the present disclosure may provide one or more technical improvements in communication devices. For example, echo reduction may improve the functionality of communication devices by reducing unwanted signals, which may also improve the user experience by reducing the presentation of unwanted sounds (e.g., reducing instances in which persons hear echoes of their own voices). Additionally, performing gain operations based on voiced or unvoiced speech may improve echo reduction and/or amplification of the receive audio signal.

Turning to the figures, FIG. 1 illustrates an example environment 100 for conducting communication sessions. The environment 100 may be arranged in accordance with at least one embodiment described in the present disclosure. The environment 100 may include a network 102, a first device 104, a second device 106, and a transcription system 130.

The network 102 may be configured to communicatively couple the first device 104, the second device 106, and the transcription system 130. In some embodiments, the network 102 may be any network or configuration of networks configured to send and receive communications between systems and devices. In some embodiments, the network 102 may include a wired network, an optical network, and/or a wireless network, and may have numerous different configurations. In some embodiments, the network 102 may also be coupled to or may include portions of a telecommunications network, including telephone lines, for sending data in a variety of different communication protocols, such as a plain old telephone system (POTS).

The first device 104 may be any suitable type of electronic or digital computing device that may be used for communication by users of the first device 104. By way of example, the first device 104 may include a desktop computer, a laptop computer, a smartphone, a mobile phone, a tablet computer, a telephone, a phone console, a caption device, a captioning telephone, or any other suitable communication device that may be used for communication by users of the first device 104.

In some embodiments, the first device 104 may be configured to conduct communication sessions via analog communications. For example, the first device 104 may be configured to receive an analog audio signal from the network 102 (e.g., from a POTS of the network 102). Additionally or alternatively, the first device 104 may be configured to transmit an analog audio signal to another device (e.g., the second device 106) via the network 102 (e.g., via the POTS of the network 102).

The second device 106 may be analogous to the first device 104. For example, the second device 106 may be any suitable type of electronic or digital computing device that may be used for communication by users of the second device 106. By way of example, the second device 106 may include a desktop computer, a laptop computer, a smartphone, a mobile phone, a tablet computer, a telephone, a phone console, a caption device, a captioning telephone, or any other suitable communication device that may be used for communication by users of the second device 106. In some embodiments, the second device 106 may be configured to conduct communication sessions via analog communications such as described with respect to the first device 104.

In some embodiments, the first device 104 or the second device 106 may include memory and at least one processor, which are configured to perform operations as described in this disclosure, among other operations. In some embodiments, the first device 104 or the second device 106 may include computer-readable instructions that are configured to be executed by the first device 104 or the second device 106 to perform operations described in this disclosure.

In some embodiments, each of the first device 104 and the second device 106 may be configured to establish communication sessions with other devices. For example, each of the first device 104 and the second device 106 may be configured to establish an outgoing communication session, such as a telephone call, video call, or other communication session, with another device over a telephone line or network. For example, each of the first device 104 and the second device 106 may communicate over a wireless cellular network, a wired Ethernet network, an optical network, or a POTS.

In some embodiments, each of the first device 104 and the second device 106 may be configured to obtain audio during a communication session. The audio may be part of a video communication, such as a video call, or an audio communication, such as a telephone call. As used in this disclosure, the term "audio" may be used generically to refer to sounds that may include spoken words. Furthermore, the term "audio" may be used generically to include audio in any format, such as a digital data format, an analog data format, or a propagating wave format. Furthermore, in the digital data format, the audio may be compressed using any suitable type of compression scheme.

As an example of obtaining audio, the first device 104 may be configured to obtain first audio of the first person 110. For example, the first device 104 may obtain the first audio from a microphone of the first device 104 or from another device that is communicatively coupled to the first device 104.

The second device 106 may also be configured to obtain second audio of the second person 112. In some embodiments, the second device 106 may obtain the second audio from a microphone of the second device 106 or from another device communicatively coupled to the second device 106. During the communication session, the first device 104 may communicate the first audio for reception by the second device 106. Alternatively or additionally, the second device 106 may communicate the second audio for reception by the first device 104.

In some embodiments, one or both of the first device 104 and the second device 106 may be configured to perform gain operations on audio signals that may traverse along a receive path of the respective device. For example, the first device 104 may be configured to present audio (e.g., broadcast via a speaker) based on a receive-path signal that is on a receive path of the first device 104. For instance, during the communication session with the second device 106, the first device 104 may receive at the receive path, via the network 102, a receive audio signal that includes the second audio that originates at the second device 106. As such, the receive-path signal on the receive path of the first device 104 may include the second audio as the receive audio signal.

In some embodiments, the first device 104 may be configured to apply a positive gain to the receive-path signal in response to the receive-path signal including the receive audio signal. The amplification of the receive-path signal may thus amplify the receive audio signal and accordingly amplify the second audio as presented by the first device 104. In these and other embodiments, the first device 104 may be configured to determine whether the receive audio signal of the receive-path signal corresponds to speech. In the present disclosure, an audio signal that corresponds to speech may be referred to as a "speech signal." In some embodiments, in response to determining that the receive audio signal includes a receive speech signal, the first device 104 may be configured to apply positive gain. Additionally or alternatively, the first device 104 may be configured to determine whether the receive speech signal corresponds to voiced speech or unvoiced speech. In these or other embodiments, the first device 104 may be configured to perform different operations with respect to amplification of the receive-path signal depending on whether the receive speech signal corresponds to voiced speech or unvoiced speech as detailed below. In some embodiments, the first device 104 may be configured to perform amplification using one or more operations detailed below with respect to FIG. 2.

In these or other embodiments, the first device 104 may be configured to generate a transmit audio signal that includes the first audio and that is intended for the second device 106. Additionally or alternatively, the first device 104 may include a transmit path that may be configured to have the transmit audio signal traverse thereon. The transmit path may be communicatively coupled to the network 102 such that the first device 104 may be configured to transmit the transmit audio signal to the second device 106 via the transmit path and the network 102. In some instances, the transmit audio signal transmitted from the first device 104 may be an analog audio signal. Additionally, a communication interface between the first device 104 and the network 102 may be such that at least a portion of the analog transmit audio signal may be reflected onto the receive path of the first device 104 as an echo audio signal that is a reflection of the transmit audio signal. For instance, impedance mismatches at the communication interface may cause the reflection.

In these or other embodiments, the first device 104 may be configured to perform one or more gain operations on the receive-path signal to attenuate the echo audio signal. For example, the first device 104 may be configured to determine that the receive-path signal includes the echo audio signal based on a determination that the transmit audio signal is traversing the transmit path. The first device 104 may be configured to apply a negative gain to the receive-path signal in response to determining that the receive-path signal includes the echo audio signal.

In these or other embodiments, the first device 104 may be configured to determine whether the echo audio signal of the receive-path signal corresponds to speech. In these or other embodiments, in response to determining that the echo audio signal includes an echo speech signal, the first device 104 may be configured to apply a negative gain. Additionally or alternatively, the first device 104 may be configured to determine whether the echo speech signal corresponds to voiced speech or unvoiced speech. In these or other embodiments, the first device 104 may be configured to perform different operations with respect to attenuation of the receive-path signal depending on whether the echo speech signal corresponds to voiced speech or unvoiced speech. In some embodiments, the first device 104 may be configured to perform echo cancellation operations using one or more operations detailed below with respect to FIG. 2.

Additionally or alternatively, in some instances a double-talk situation may occur in which both the first person 110 and the second person 112 may be speaking at the same time or substantially the same time. During the double-talk situation, the transmit path of the first device 104 may have a transmit speech signal traversing thereon and the receive path of the first device 104 may have the receive speech signal traversing thereon. Additionally, the receive path of the first device 104 may have the echo speech signal traversing thereon, which may be a reflection of the transmit speech signal. As such, during the double-talk situation, the receive-path signal may include the receive speech signal and the echo speech signal.

In some embodiments, the first device 104 may be configured to perform gain operations with respect to the receive-path signal in a manner that may attenuate the echo speech signal included in the receive-path signal while also limiting attenuation of the receive speech signal included in the receive-path signal. For example, the first device 104 may be configured to apply a negative gain to frequency components of the receive-path signal that correspond to the echo speech signal but that do not correspond to the receive speech signal. As such, the echo speech signal may be attenuated while also reducing or minimizing attenuation of the receive speech signal. In these or other embodiments, the attenuation operations may be based on whether the echo speech signal corresponds to voiced speech or unvoiced speech. In some embodiments, the first device 104 may be configured to perform one or more operations described below with respect to FIG. 2 in performing the echo reduction during double-talk situations.

In these or other embodiments, the first device 104 may be configured to perform gain operations with respect to the receive-path signal during double-talk situations in a manner that may amplify the receive speech signal while also limiting amplification of the echo speech signal. For example, the first device 104 may be configured to apply a positive gain to frequency components of the receive-path signal that correspond to the receive speech signal but that do not correspond to the echo speech signal. As such, the receive speech signal may be amplified while also reducing or minimizing amplification of the echo speech signal. In these or other embodiments, the amplification operations may be based on whether the receive speech signal corresponds to voiced speech or unvoiced speech. In some embodiments, the first device 104 may be configured to perform one or more operations described below with respect to FIG. 2 in performing the amplification during double-talk situations.

In some embodiments, the environment 100 may include the transcription system 130. One or both of the first device 104 and the second device 106 may be configured to provide the first audio, the second audio, or both the first audio and the second audio to the transcription system 130.

In general, the transcription system 130 may be configured to obtain transcriptions of audio using a speech recognition system 132. In some embodiments, the transcription system 130 or the speech recognition system 132 may include any configuration of hardware and/or software, such as one or more processors, servers, or database servers that are configured to perform a task. For example, the transcription system 130 or the speech recognition system 132 may include one or multiple computing systems, such as multiple servers that each include memory and at least one processor. In these or other embodiments, the transcription system 130 and the speech recognition system 132 may be integrated together as a same system. Additionally or alternatively, the transcription system 130 and the speech recognition system 132 may be separate systems that are communicatively coupled (e.g., via the network 102). In these or other embodiments, the transcription system 130 and the speech recognition system 132 may be controlled or maintained by a same entity. Additionally or alternatively, the transcription system 130 and the speech recognition system 132 may be controlled or maintained by different entities such that the speech recognition system 132 may be a third-party system with respect to the transcription system 130.

The speech recognition system 132 may be configured to generate transcriptions of audio. In these and other embodiments, the speech recognition system 132 may be configured to recognize speech in the audio. Based on the recognized speech, the speech recognition system 132 may output a transcription of the speech. The transcription may be a written version of the speech in the audio. In the present disclosure, use of the term "transcription" may be used generically to include a transcription of text in any format, such as presented text or data that represents the text.

In some embodiments, the speech recognition system 132 may be a machine based automatic speech recognition (ASR) system that may include an ASR engine trained to recognize speech. In some embodiments, the ASR engine may be trained for general speech and not specifically trained using speech patterns of the participants in the interaction related to the communication session, e.g., the first person 110 or the second person 112. Alternatively or additionally, the ASR engine may be specifically trained using speech patterns of one of the participants of the interaction.

Alternatively or additionally, the speech recognition system 132 may be a re-voicing transcription system. Re-voicing transcription systems may receive and broadcast audio to a captioning agent (e.g., a human captioning agent). The captioning agent may listen to the broadcast and speak the words from the broadcast. The words spoken by the captioning agent are captured to generate re-voiced audio. The re-voiced audio may be used by a speech recognition program to generate the transcription of the audio. In some embodiments, the speech recognition program may be trained to the voice of the captioning agent.

An example of the transcription system 130 obtaining transcriptions is now provided in the context of the environment 100 of FIG. 1 with respect to the communication session conducted between the first device 104 and the second device 106. For example, in some embodiments, as indicated above, the transcription system 130 may receive the first audio that may be obtained by the first device 104 during the communication session. In some embodiments, the transcription system 130 may receive the first audio from the first device 104. Additionally or alternatively, the transcription system 130 may receive the first audio from the second device 106.

The transcription system 130 may be configured to obtain a first transcription of the first audio. For example, the transcription system 130 may communicate the first audio to the speech recognition system 132. The speech recognition system 132 may generate the first transcription of the first audio. In these or other embodiments, the speech recognition system 132 may communicate the first transcription to the transcription system 130. Additionally or alternatively, the transcription system 130 may be configured to obtain the first transcription in real-time or substantially in real-time as the first audio is received.

In these or other embodiments, the transcription system 130 may provide the first transcription for presentation by a display device associated with the second person 112. For example, in some embodiments, the second device 106 may include a display device configured to present the first transcription. In these or other embodiments, the transcription system 130 may communicate the first transcription to the second device 106 and the second device 106 may present the first transcription via the display device. Additionally or alternatively, the transcription system 130 may communicate the first transcription to another device associated with the second person 112 that includes a display device that may present the first transcription. Additionally or alternatively, the transcription system 130 may communicate the first transcription to the second device 106 and the second device 106 may communicate the first transcription to another device associated with the second person 112. In these or other embodiments, the other device may include a display device that may present the first transcription.

In some embodiments, the transcription system 130 may provide the first transcription for presentation during the communication session. In these or other embodiments, the transcription system 130 may provide the first transcription in real-time or substantially in real-time as the first transcription is obtained such that the first transcription may be presented in real-time or substantially in real-time with the presentation of the first audio.

In some embodiments, the transcription system 130 may be configured to perform operations similar to those described above with respect to the second audio to obtain a second transcription of the second audio. In these or other embodiments, the transcription system 130 may receive the second audio from the second device 106 and/or the first device 104.

In some embodiments, the transcription system 130 may be configured to provide the second transcription for presentation by a display device associated with the second person 112 such as described above with respect to providing the first transcription for presentation by a display device associated with the second person 112. In these or other embodiments, the second transcription may be provided for presentation by the same display device as the first transcription.

In some embodiments, the transcription system 130 may provide the second transcription for presentation during the communication session. In these or other embodiments, the transcription system 130 may provide the second transcription in real-time or substantially in real-time as the second transcription is obtained such that the second transcription may be presented in real-time or substantially in real-time with the obtaining of the second audio.

Modifications, additions, or omissions may be made to the environment 100 without departing from the scope of the present disclosure. For example, in some embodiments, the environment 100 may not include the transcription system 130. As another example, the second device 106 and/or the transcription system 130 may be configured to perform gain operations similar to those described above with respect to the first device 104 with respect to audio signals on their respective receive paths.

As another example, the transcription system 130 may include additional functionality. For example, the transcription system 130 may edit the transcriptions or make other alterations to the transcriptions after presentation of the transcriptions on one or both of the first device 104 and the second device 106.

Figure 2:
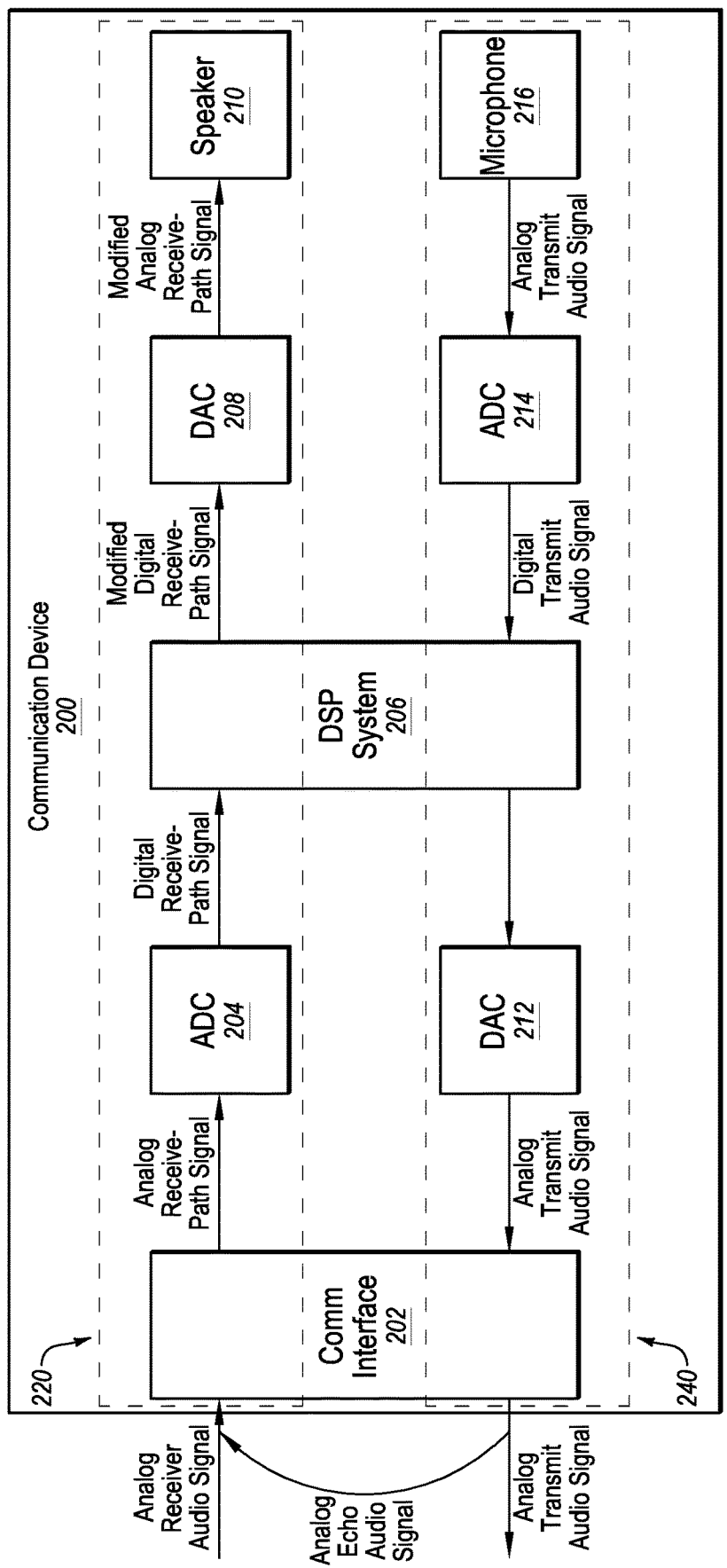
FIG. 2 illustrates an example communication device configured to perform gain operations with respect to a receive-path signal that may traverse along a receive path of the communication device.

FIG. 2 illustrates an example communication device 200 ("device 200") configured to perform gain operations with respect to a receive-path signal that may traverse along a receive path 220 of the device 200. The device 200 may be arranged in accordance with at least one embodiment described in the present disclosure. The device 200 may be an example of the first device 104 or the second device 106 of FIG. 1. Additionally or alternatively, the device 200 may be included in or part of the transcription system 130 of FIG. 1. In these or other embodiments, the communication device 200 may be a transcription telephone, such as a captioning telephone, that is configured to present transcriptions of the communication session to a hearing impaired user, such as one of the CaptionCall® 57T model family or 67T model family of captioning telephones or a device running the CaptionCall® mobile app.

In some embodiments, the device 200 may include the receive path 220, which may include a communication interface 202, an analog to digital (ADC) converter 204, a digital signal processing (DSP) system 206, a digital to analog (DAC) converter 208, and a speaker 210. Additionally or alternatively, the device 200 may include a transmit path 240, which may include the communication interface 202, a DAC 212, the DSP system 206, an ADC 214, and a microphone 216.

Signals that traverse the receive path 220 and the transmit path 240 may include any sort of audio signal that may represent or carry information that represents corresponding audio. Additionally, the signals may be analog signals, digital signals, or a combination of analog and digital signals. For example, a transmit audio signal that may be transmitted from the device 200 may traverse along the transmit path 240 prior to being transmitted from the device 200. Additionally, a receive audio signal that may be received by the device 200 may traverse along the receive path 220. Additionally or alternatively, an echo audio signal that may include a reflection of the transmit audio signal may also traverse along the receive path 220. In general, the signal that traverses along the receive path 220 may be referred to as a "receive-path signal." In some instances, the receive-path signal may include the receive audio signal but not the echo audio signal. Additionally or alternatively, the receive-path signal may include the echo audio signal but not the receive audio signal. Additionally or alternatively, a double-talk situation may occur, during which the receive-path signal may include both the echo audio signal and the receive audio signal.

In some embodiments, the transmit audio signal may originate from the microphone 216 during a communication session between the device 200 and another communication device. The microphone 216 may be configured to capture sound (e.g., the speech of a person using the device 200 during the communication session). The microphone 216 may additionally be configured to generate the transmit audio signal based on the captured sound. In some embodiments, the microphone 216 may be configured to generate the transmit audio signal as an analog signal.

The ADC 214 may be configured to receive the analog transmit audio signal that may be output by the microphone 216. The ADC 214 may include any suitable system, apparatus, or device that may be configured to convert the analog transmit audio signal to a digital transmit audio signal. In the description of the transmit audio signal traversing the transmit path 240, general reference to the transmit audio signal without specifying whether the transmit audio signal is analog or digital may refer to the transmit audio signal in digital or analog form.

The DSP system 206 may be configured to receive the digital transmit audio signal that may be generated by the ADC 214. The DSP system 206 may include any suitable system, apparatus, or device that may be configured to perform operations on the received digital transmit audio signal. For example, the DSP system 206 may include a computing system such as described below with respect to FIG. 3 that is configured to perform operations described herein with respect to the DSP system 206.

In some embodiments, the DSP system 206 may be configured to determine that the transmit audio signal is traversing the transmit path 240 in response to detecting the presence of the digital transmit audio signal. In these or other embodiments, the DSP system 206 may be configured to determine that the receive-path signal includes the echo audio signal in response to determining that the transmit audio signal is traversing the transmit path 240. Additionally or alternatively, the DSP system 206 may be configured to know an echo delay between when the digital transmit audio signal is received at the DSP system 206 and when the transmit audio signal is transmitted from the device 200 and at least partially reflected onto the receive path 220 to create the echo audio signal. As such, in some embodiments, the DSP system 206 may be configured to know which portions of the transmit audio signal correspond to which portions of the echo audio signal at a given time.

In these or other embodiments, the DSP system 206 may be configured to perform any suitable speech analysis technique to determine whether the transmit audio signal corresponds to speech and thus includes a transmit speech signal. Additionally or alternatively, in response to determining that the transmit audio signal includes the transmit speech signal, the DSP system 206 may be configured to determine that the echo audio signal corresponds to speech and thus includes an echo speech signal. Additionally or alternatively, the DSP system 206 may be configured to determine which portions of the echo audio signal include the echo speech signal at any given time based on a determination as to which portions of the transmit audio signal include speech and based on the echo delay.

In these or other embodiments, the DSP system 206 may be configured to determine whether the transmit speech signal corresponds to voiced speech or unvoiced speech using any suitable speech analysis technique. For example, voiced speech may produce a pitch period with distinct frequency components that may repeat on a periodic basis. In contrast, unvoiced speech may have a comparatively broad frequency spectrum. Accordingly, in some embodiments, the DSP system 206 may be configured to analyze the transmit speech signal to determine whether the transmit speech signal includes repeating distinct frequency components, and thus voiced speech, or a more broad frequency spectrum and thus unvoiced speech.

In these or other embodiments, the DSP system 206 may be configured to determine whether the echo speech signal corresponds to voiced or unvoiced speech based on the determination as to whether the transmit speech signal corresponds to voiced or unvoiced speech. In these or other embodiments, the DSP system 206 may be configured to determine which portions of the echo speech signal correspond to voiced or unvoiced speech based on determining which portions of the transmit speech signal correspond to voiced or unvoiced speech and based on the echo delay.

As detailed further below, in some embodiments, the DSP system 206 may be configured to perform gain operations on the receive-path signal based on determining that the receive-path signal includes the echo audio signal. In these or other embodiments, the DSP system 206 may be configured to perform the gain operations on the receive-path signal based on determining that the receive-path signal includes the echo speech signal. In these or other embodiments, the DSP system 206 may be configured to perform the gain operations on the receive-path signal based on whether the echo speech signal corresponds to voiced speech or unvoiced speech.

In some embodiments, the DSP system 206 may be configured to perform one or more other operations with respect to the digital transmit audio signal. For example, the DSP system may be configured to perform one or more gain operations, noise filtering operations, etc. with respect to the digital transmit audio signal.

The DSP system 206 may be configured to output the digital transmit audio signal after performing the respective operations with respect to the digital transmit audio signal. In some embodiments, the DAC 212 may be configured to receive the digital transmit audio signal after the digital transmit audio signal has been output by the DSP system 206. The DAC 212 may include any suitable system, apparatus, or device that may be configured to convert the digital transmit audio signal back to an analog transmit audio signal.

The communication interface 202 may be configured to receive the analog transmit audio signal after the analog transmit audio signal has been output by the DAC 212. The communication interface 202 may include any suitable system, apparatus, or device that is configured to interface the device 200 with a communication network such as the network 102 described above with respect to FIG. 1.

For example, the communication interface may include a transmit interface that may communicatively couple the transmit path 240 with the communication network such that the analog transmit audio signal may be communicated from the transmit path 240 to the communication network. Additionally or alternatively, the communication interface may include a receive interface that may communicatively couple the receive path 220 with the communication network such that an analog receive audio signal may be communicated from the communication network to the receive path 220. In some embodiments, the communication network that may be interfaced with the communication interface 202 may include a POTS network. By way of example, in these or other embodiments, the communication interface 202 may include a telephone jack such as an RJ11 connector.

In some embodiments, the communication interface 202 may not perfectly interface with the communication network (e.g., impedance mismatches, inadequate shielding, etc., may be present) such that, as alluded above, at least a portion of the analog transmit audio signal that is transmitted from the transmit interface of the communication interface 202 may be reflected to the receive interface of the communication interface 202. The reflection of the transmit audio signal may be the echo audio signal that traverses the receive path 220.

As discussed above, the receive path 220 may include the communication interface 202, which may receive the receive audio signal (e.g., via the receive interface). The receive audio signal may be a transmit audio signal communicated from the other communication device participating in the communication session with the device 200. As also discussed above, in some instances, the communication interface 202 may receive the echo audio signal. In these or other embodiments, the receive audio signal and the echo audio signal, which may be received at the communication interface, may be analog signals.

The communication interface 202 may be communicatively coupled to the receive path 220 such that the receive-path signal that traverses along the receive path 220 includes the receive audio signal and/or the echo audio signal. In these or other embodiments, as discussed above, the receive audio signal and the echo audio signal may be analog signals such that the receive-path signal that may be output at the communication interface 202 may be an analog signal.

In some embodiments, the receive path 220 may include the ADC 204, which may be configured to receive the analog receive-path signal that may be output by the communication interface 202. The ADC 204 may include any suitable system, apparatus, or device that may be configured to convert the analog receive-path signal to a digital receive-path signal. In the description of the receive-path signal that traverses along the receive path 220, general reference to the receive-path signal without specifying whether the receive-path signal is analog or digital may refer to the receive-path signal in digital or analog form.

The DSP system 206 may be configured to receive the digital receive-path signal that may be generated by the ADC 204. The DSP system 206 may also be configured to perform operations on the received digital receive-path signal.

In some embodiments, the DSP system 206 may be configured to determine whether the receive-path signal includes the echo audio signal based on determining whether the transmit audio signal is traversing the transmit path 240, as discussed above. Additionally or alternatively, as also discussed above, the DSP system 206 may be configured to know which portions of the transmit audio signal correspond to which portions of the echo audio signal at a given time based on the echo delay.

Additionally or alternatively, the DSP system 206 may be configured to determine whether the receive-path signal includes the receive audio signal. For example, in some embodiments, the DSP system 206 may be configured to detect that the receive path 220 includes the receive-path signal traversing thereon by receiving the digital receive-path signal. Additionally, as discussed above, the DSP system 206 may be configured to determine whether the receive-path signal includes the echo audio signal. In response to detecting the receive-path signal and in response to determining that the receive-path signal does not include the echo audio signal, the DSP system 206 may determine that the receive-path signal includes the receive audio signal.

Additionally, the DSP 206 may be configured to determine the signal pattern (e.g., frequencies and amplitudes) of the echo audio signal based on the signal pattern of the digital transmit audio signal. In response to detecting the receive-path signal and in response to determining that the receive-path signal includes the echo audio signal, the DSP system 206 may be configured to compare the signal pattern of the echo audio signal with the signal pattern of the receive-path signal. In response to the comparison indicating that the signal pattern of the receive-path signal substantially matches the signal pattern of the echo audio signal, the DSP system 206 may be configured to determine that the receive-path signal does not include the receive audio signal. In contrast, in response to the comparison indicating that the signal pattern of the receive-path signal does not substantially match the signal pattern of the echo audio signal, the DSP system 206 may be configured to determine that the receive-path signal includes the receive audio signal and the echo audio signal.

In these or other embodiments, the DSP system 206 may be configured to perform any suitable speech analysis technique to determine whether the receive-path signal corresponds to speech. For example, as discussed above, the DSP system 206 may be configured to determine that the receive-path signal includes the echo audio signal. Additionally, the DSP system 206 may be configured to determine that the echo audio signal corresponds to speech and thus includes an echo speech signal as also discussed above. The DSP system 206 may be configured to thus determine that the receive-path signal corresponds to speech in response to determining that the receive-path signal includes the echo speech signal.

Additionally or alternatively, the DSP system 206 may be configured to perform speech analysis operations on the receive-path signal in response to determining that the receive-path signal includes the receive audio signal. In these or other embodiments, the DSP system 206 may be configured to determine whether the receive-path signal corresponds to speech (and thus may include a receive speech signal) based on the speech analysis of the receive-path signal.

For example, in instances in which the DSP system 206 determines that the receive-path signal includes the receive audio signal and not the echo audio signal, the DSP system 206 may perform speech analysis operations on the receive-path signal to determine whether the receive-path signal (and thus the receive audio signal) corresponds to speech. In these instances, in response to determining that the receive-path signal corresponds to speech and in response to determining that the receive-path signal includes the receive audio signal and not the echo audio signal, the DSP system 206 may determine that the receive-path signal includes the receive speech signal.

As another example, in instances in which the DSP system 206 determines that the receive-path signal includes the receive audio signal and the echo audio signal, the DSP system 206 may identify which portions of the receive-path signal correspond to the receive audio signal but not the echo audio signal. For instance, the DSP system 206 may subtract out the signal pattern of the echo audio signal from the receive-path signal to identify the receive audio signal in the receive-path signal. In these or other embodiments, the DSP system 206 may perform speech analysis operations on the identified receive audio signal to determine whether the receive audio signal corresponds to speech and thus includes the receive speech signal. In these instances, in response to determining that the receive audio signal includes the receive speech signal, the DSP system 206 may determine that the receive-path signal includes the receive speech signal.

In these or other embodiments, the DSP system 206 may be configured to determine whether the echo speech signal identified in the receive-path signal corresponds to voiced speech or unvoiced speech such as described above. Additionally or alternatively, the DSP system 206 may be configured to determine whether the receive speech signal identified in the receive-path signal corresponds to voiced speech or unvoiced speech using any suitable technique.

The DSP system 206 may be configured to perform different gain operations on the receive-path signal depending on whether the receive-path signal includes both the receive audio signal and the receive echo signal, whether the receive-path signal includes the receive audio signal but not the receive echo signal, or whether the receive-path signal includes the echo audio signal but not the receive audio signal. In these or other embodiments, the DSP system 206 may be configured to perform different gain operations on the receive-path signal depending on whether the receive audio signal includes the receive speech signal and/or the echo audio signal includes the echo speech signal. In these or other embodiments, the DSP system 206 may be configured to perform the different gain operations on the receive-path signal depending on whether the receive speech signal and/or the echo speech signal correspond to voiced speech or unvoiced speech.

For example, the receive-path signal may have a first portion that corresponds to a first time frame in which the first portion may include both the receive audio signal and the echo audio signal such that a double-talk situation may be present at the first portion. Additionally, the receive-path signal may include a second portion that corresponds to a second time frame in which the second portion may include the receive audio signal but not the echo audio signal. Further, the receive-path signal may include a third portion that corresponds to a third time frame in which the third portion may include the echo audio signal but not the receive audio signal. The DSP system 206 may perform different types of gain operations on the first portion, the second portion, and the third portion due to differences in the receive-path signal including the receive audio signal and/or the echo audio signal at the different portions. Additionally, the DSP system 206 may perform different types of gain operations with respect to a particular portion depending on whether the particular portion corresponds to speech. Further, in some embodiments, the DSP system 206 may perform different types of gain operations with respect to the particular portion depending on whether the speech is determined to be voiced or unvoiced speech.

For instance, the following example is given with respect to the first portion of the receive-path signal that includes the receive audio signal and the echo audio signal. The DSP system 206 may determine that the first portion includes the receive audio signal and the echo audio signal. Additionally, the receive audio signal and the echo audio signal at the first portion may correspond to speech such that the DSP system 206 may determine that the first portion includes the receive speech signal and the echo speech signal.

In these or other embodiments, the DSP system 206 may analyze the first portion to identify a first sub-portion of the first portion of the receive-path signal that includes, at a particular time, a first frequency component that corresponds to the echo speech signal and a second frequency component that corresponds to the receive speech signal. In some embodiments, the DSP system 206 may be configured to identify that the first frequency component corresponds to the echo speech signal based on the signal pattern of the echo speech signal that may be identified from the corresponding transmit speech signal as described above. Additionally or alternatively, the DSP system 206 may be configured to identify that the second frequency component corresponds to the receive speech signal by subtracting the echo speech signal out of the receive-path signal to identify the receive speech signal and its corresponding signal pattern. The DSP system 206 may be configured to identify the second frequency component based on the signal pattern of the receive speech signal. Additionally or alternatively, based on the signal pattern of the echo speech signal, the DSP system 206 may determine that the second frequency component does not correspond to the echo speech signal and thus may determine that the second frequency component corresponds to the receive speech signal.

The first frequency component may be different from the second frequency component in that the first frequency component may correspond to a different frequency than the second frequency component. The gain operations that may be performed on the first sub-portion by the DSP system 206 may be based on the first frequency component differing from the second frequency component and based on the first frequency component corresponding to the echo speech signal and the second frequency component corresponding to the receive speech signal.

For example, the DSP system 206 may be configured to apply a negative gain to the first frequency component while avoiding applying the negative gain to the second frequency component based on the first frequency component corresponding to the echo speech signal and based on the second frequency component corresponding to the receive speech signal. As such, the first frequency component (and thus the echo speech signal) may be attenuated while avoiding attenuating the second frequency component and thus avoiding attenuating the receive speech signal. In some embodiments, the DSP system 206 may be configured to use a filter that is configured to filter out the first frequency but not the second frequency to attenuate the first frequency component and avoid attenuating the second frequency component. For example, the filter used to filter out the first frequency component but not the second frequency component may be a digital bandpass filter with a pass band that is configured to include the second frequency component but not the first frequency component. In these or other embodiments, the attenuation of the first frequency component may be based on a signal mask of the echo speech signal that may indicate the signal pattern of the echo speech signal.

In these or other embodiments, the DSP system 206 may be configured to apply a positive gain to the second frequency component while avoiding applying the positive gain to the first frequency component based on the first frequency component corresponding to the echo speech signal and based on the second frequency component corresponding to the receive speech signal. As such, the second frequency component (and thus the receive speech signal) may be amplified while avoiding amplifying the first frequency component and thus avoiding amplifying the echo speech signal. In some embodiments, the DSP system 206 may be configured to apply the positive gain after filtering out the first frequency component to avoid amplifying the first frequency component while amplifying the second frequency component.

In some embodiments, the DSP system 206 may be configured to perform the gain operations on the first frequency component in the manner described in response to the first frequency component corresponding to the echo speech signal as opposed to the echo audio signal not corresponding to speech. Additionally or alternatively, the DSP system 206 may be configured to perform the gain operations on the second frequency component in the manner described in response to the second frequency component corresponding to the receive speech signal as opposed to the receive audio signal not corresponding to speech.

In these or other embodiments, the DSP system 206 may be configured to perform the gain operations on the first frequency component in the manner described in response to the echo speech signal at the first sub-portion corresponding to voiced speech as opposed to unvoiced speech. For example, as described above, unvoiced speech may have a relatively broad frequency spectrum as compared to voiced speech. As such, attenuation of a narrow frequency band that includes the first frequency component in instances in which the echo speech signal corresponds to unvoiced speech may not filter out the echo speech signal in a significant manner (e.g., such that the perception of the echo is reduced) or which may merely distort the echo speech signal. However, attempts to filter out the frequency spectrum of the echo speech signal in unvoiced speech instances may filter out frequency components of the receive speech signal and thus adversely affect the receive speech signal. Additionally or alternatively, in these or other embodiments, the DSP system 206 may be configured to perform the gain operations on the second frequency component in the manner described in response to the receive speech signal at the first sub-portion corresponding to voiced speech as opposed to unvoiced speech due to similar considerations.

In these or other embodiments, the DSP system 206 may analyze the first portion to identify a second sub-portion of the first portion of the receive-path signal that includes, at another particular time, a third frequency component that corresponds to the echo speech signal and a fourth frequency component that corresponds to the receive speech signal. In some embodiments, the DSP system 206 may be configured to identify that the third frequency component corresponds to the echo speech signal based on the signal pattern of the echo speech signal that may be identified from the corresponding transmit speech signal as described above. Additionally or alternatively, the DSP system 206 may be configured to identify that the fourth frequency component corresponds to the receive speech signal in a manner such as described above with respect to identifying that the second frequency component corresponds to the receive speech signal.

The third frequency component may be the same as or substantially the same as the fourth frequency component in that the third frequency component and the fourth frequency component may correspond to the same or substantially the same frequency. The gain operations that may be performed on the second sub-portion by the DSP system 206 may be based on the third frequency component being the same as or substantially the same as the fourth frequency component.

For example, the DSP system 206 may be configured to avoid applying a negative gain to the third frequency component because applying a negative gain to the third frequency component may also result in application of a negative gain to the fourth frequency component, which may attenuate the receive speech signal. In some embodiments, the avoiding of attenuating the third frequency component may be performed even in instances in which the mask of the echo speech signal may indicate that the third frequency component be attenuated. Similarly, the DSP system 206 may be configured to avoid applying a positive gain to the fourth frequency component because applying a positive gain to the fourth frequency component may also result in application of a positive gain to the third frequency component, which may amplify the echo speech signal.

As another example, the following example is given with respect to the second portion of the receive-path signal that includes the receive audio signal but not the echo audio signal. The DSP system 206 may determine that the second portion includes the receive audio signal but not the echo audio signal such as described above. Additionally, the receive audio signal at the second portion may correspond to speech such that the DSP system 206 may determine that the second portion includes the receive speech signal such as described above.

The gain operations that may be performed on the second portion by the DSP system 206 may be based on the second portion including the receive speech signal and not including the echo audio signal. For example, the DSP system 206 may be configured to apply a positive gain to the second portion in response to the second portion including the receive speech signal and not the echo audio signal.

Additionally or alternatively, the gain operations that may be performed on the second portion by the DSP system 206 may be based on the second portion including the receive speech signal as opposed to the receive audio signal not corresponding to speech. For example, the DSP system 206 may be configured to apply a positive gain to the second portion in response to the second portion including the receive speech signal. In contrast, the DSP system 206 may be configured to not apply a positive gain to the second portion if the receive audio signal at the second portion did not correspond to speech.

In these or other embodiments, the gain operations that may be performed on the second portion by the DSP system 206 may be based on the receive speech signal at the second portion corresponding to voiced speech or unvoiced speech. For example, in response to the receive speech signal corresponding to voiced speech, the DSP system 206 may be configured to apply a positive gain to the specific frequency components that correspond to the voiced speech. In these or other embodiments, the DSP system 206 may be configured to also avoid applying the positive gain to other frequency components that do not correspond to the voice speech. In some embodiments, the DSP system 206 may be configured to use one or more filters configured according to the specific frequency components to amplify the specific frequency components. In these or other embodiments, the DSP system 206 may be configured to perform the filtering and/or amplification based on a mask of the receive speech signal that may be based on the signal pattern of the receive speech signal. The application of the positive gain in this manner with respect to voiced speech may amplify the receive speech signal while avoiding amplifying other less desired parts of the receive path signal, such as noise. As such, the signal quality (e.g., the signal to noise ratio) of the receive path signal may improve by applying the positive gain in this manner.

In response to the receive speech signal corresponding to unvoiced speech, the DSP system 206 may be configured to apply a positive gain to the frequency spectrum that corresponds to the unvoiced speech ("unvoiced speech frequency spectrum") In these or other embodiments, the DSP system 206 may be configured to identify a difference between the unvoiced speech frequency spectrum and an estimated noise floor frequency spectrum of the receive-path signal. Additionally or alternatively, the DSP system 206 may be configured to apply the positive gain to the unvoiced frequency spectrum based on the difference between the unvoiced speech frequency spectrum and the estimated noise floor frequency spectrum. The application of the positive gain based on the difference may be such that frequency components of the second portion that correspond to the unvoiced speech frequency spectrum are amplified more than frequency components of the second portion that correspond to the noise floor frequency spectrum. As such, the application of the positive gain in this manner with respect to unvoiced speech may improve the signal quality (e.g., the signal to noise ratio) of the receive path signal.

As another example, the following example is given with respect to the third portion of the receive-path signal that includes the echo audio signal but not the receive audio signal. The DSP system 206 may determine that the third portion includes the echo audio signal but not the receive audio signal such as described above. Additionally, the echo audio signal at the third portion may correspond to speech such that the DSP system 206 may determine that the third portion includes the echo speech signal such as described above.

The gain operations that may be performed on the third portion by the DSP system 206 may be based on the third portion including the echo speech signal and not including the receive audio signal. For example, the DSP system 206 may be configured to apply a negative gain to the third portion in response to the third portion including the echo speech signal and not the receive audio signal.

Additionally or alternatively, the gain operations that may be performed on the third portion by the DSP system 206 may be based on the third portion including the echo speech signal as opposed to the echo audio signal not corresponding to speech. In these or other embodiments, the gain operations that may be performed on the third portion by the DSP system 206 may be based on the echo speech signal at the third portion corresponding to voiced speech or unvoiced speech.

For example, in response to the echo speech signal corresponding to voiced speech, the DSP system 206 may be configured to apply a negative gain to the specific frequency components that correspond to the voiced speech. In some embodiments, the DSP system 206 may be configured to use one or more filters configured according to the specific frequency components to attenuate the specific frequency components. In these or other embodiments, the DSP system 206 may be configured to perform the filtering and/or amplification based on the mask of the echo speech signal.

As another example, in response to the echo speech signal corresponding to unvoiced speech, the DSP system 206 may be configured to perform attenuation operations with respect to the third portion without use of the mask of the echo speech signal. Additionally or alternatively, the DSP system 206 may also be configured to perform attenuation operations with respect to the third portion without use of the mask of the echo speech signal at the third portion if the echo audio signal at the third portion did not correspond to speech.

Following the performance of the gain operations with respect to the digital receive-path signal, the DSP system 206 may output a modified digital receive-path signal that may be modified based on the gain operations. In some embodiments the receive path 220 of the device 200 may include the DAC 208. The DAC 208 may be configured to receive the modified digital receive-path signal after the digital receive-path signal has been output by the DSP system 206. The DAC 208 may include any suitable system, apparatus, or device that may be configured to convert the modified digital receive-path signal to an analog modified receive-path signal.

In some embodiments, the receive path 220 may include the speaker 210. The speaker 210 may be configured to receive the modified analog receive-path signal after the analog receive-path signal has been output by the DAC 208. The speaker 210 may include any suitable system, apparatus, or device, configured to broadcast the audio that may be represented by the modified analog receive-path signal.

Modifications, additions, or omissions may be made to the device 200 without departing from the scope of the present disclosure. For example, in some embodiments, the device 200 may include components in addition to those described. Additionally or alternatively, in some embodiments, the device 200 may not include one or more of the components described. Further, in some embodiments, the nature of the signals (e.g., analog or digital) may be different at different locations of the device 200 than specifically described. In addition, the specific implementation or configuration of the device 200 may vary. For example, in some embodiments, the DSP system 206 may be a single DSP system such as illustrated in FIG. 2. Additionally or alternatively, the DSP system 206 may include a transmit DSP system configured to perform operations with respect to transmit audio signals and a separate receive DSP system configured to perform operations with respect to receive-path signals. In these or other embodiments, the transmit DSP system may communicate with the receive DSP system (e.g., the transmit DSP system may communicate with the receive DSP system with respect to echo reduction operations).

Figure 3:
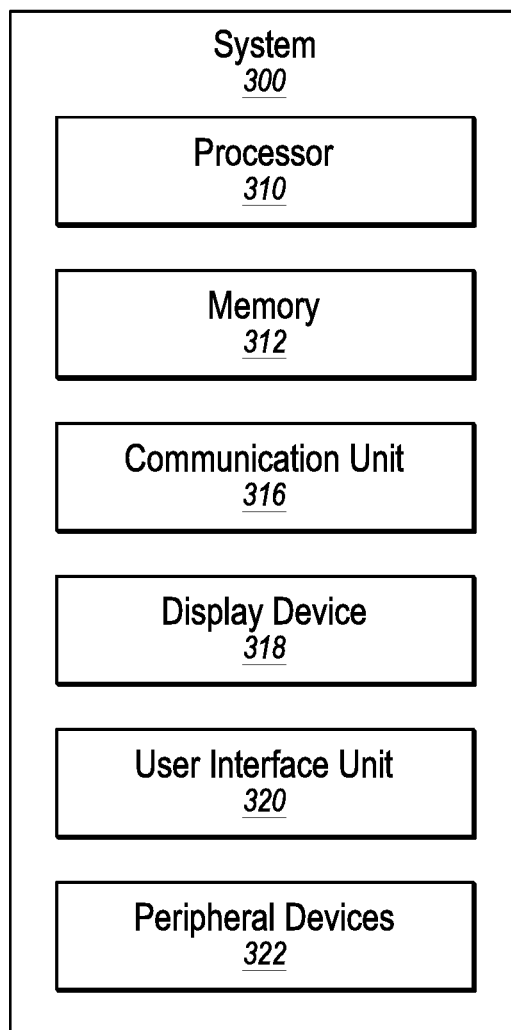
FIG. 3 illustrates an example system that may be used in the performance of gain operations.

FIG. 3 illustrates an example system 300 that may be used in the performance of gain operations described herein. The system 300 may include a processor 310, memory 312, a communication unit 316, a display device 318, a user interface unit 320, and a peripheral device 322, which all may be communicatively coupled. In some embodiments, the system 300 may be part of any of the systems or devices described in this disclosure.

For example, the system 300 may be part of the first device 104 of FIG. 1 and may be configured to perform one or more of the tasks described above with respect to the first device 104. As another example, the system 300 may be part of the second device 106 of FIG. 1 and may be configured to perform one or more of the tasks described above with respect to the second device 106. As another example, the system 300 may be part of the transcription system 130 of FIG. 1 and may be configured to perform one or more of the tasks described above with respect to the transcription system 130. Additionally or alternatively, the DSP system 206 of FIG. 2 may be included in the system 300. Additionally or alternatively, the system 300 may be part of another device that may be configured to perform gain operations as described herein.

Generally, the processor 310 may include any suitable special-purpose or general-purpose computer, computing entity, or processing device including various computer hardware or software modules and may be configured to execute instructions stored on any applicable computer-readable storage media. For example, the processor 310 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 3, it is understood that the processor 310 may include any number of processors distributed across any number of networks or physical locations that are configured to perform individually or collectively any number of operations described herein. In some embodiments, the processor 310 may interpret and/or execute program instructions and/or process data stored in the memory 312. In some embodiments, the processor 310 may execute the program instructions stored in the memory 312.

For example, in some embodiments, the processor 310 may execute program instructions stored in the memory 312 that are related to gain operations such that the system 300 may perform or direct the performance of the operations associated therewith as directed by the instructions. In these and other embodiments, the instructions may be used to perform one or more operations described above with respect to the DSP 206 of FIG. 2, and/or one or more of the operations of the method 400 of FIG. 4.

The memory 312 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 310.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 310 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of *In re Nuijten*, 500 F.3d 1346 (Fed. Cir. 2007). Combinations of the above may also be included within the scope of computer-readable media.

The communication unit 316 may include any component, device, system, or combination thereof that is configured to transmit or receive information over a network. In some embodiments, the communication unit 316 may communicate with other devices at other locations, the same location, or even other components within the same system. For example, the communication unit 316 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), a telephone jack, and/or the like. The communication unit 316 may permit data to be exchanged with a network and/or any other devices or systems described in the present disclosure. In some embodiments, the communication unit 316 may be an example of or include the communication interface 202 of FIG. 2.

The display device 318 may be configured as one or more displays that present images, words, etc., like an LCD, LED, projector, or other type of display. The display device 318 may be configured to present video, text captions, user interfaces, and other data as directed by the processor 310. For example, when the system 300 is included in the second device 106 of FIG. 1, the display device 318 may be configured to present transcriptions and/or a selectable element.

The user interface unit 320 may include any device to allow a user to interface with the system 300. For example, the user interface unit 320 may include a mouse, a track pad, a keyboard, buttons, and/or a touchscreen, among other devices. The user interface unit 320 may receive input from a user and provide the input to the processor 310. In some embodiments, the user interface unit 320 and the display device 318 may be combined.

The peripheral devices 322 may include one or more devices. For example, the peripheral devices may include a microphone, an imager, and/or a speaker, among other peripheral devices. In these and other embodiments, the microphone may be configured to capture audio. The imager may be configured to capture images. The images may be captured in a manner to produce video or image data. In some embodiments, the speaker may broadcast audio received by the system 300 or otherwise generated by the system 300.

Modifications, additions, or omissions may be made to the system 300 without departing from the scope of the present disclosure. For example, in some embodiments, the system 300 may include any number of other components that may not be explicitly illustrated or described. Further, depending on certain implementations, the system 300 may not include one or more of the components illustrated and described.

Figure 4:
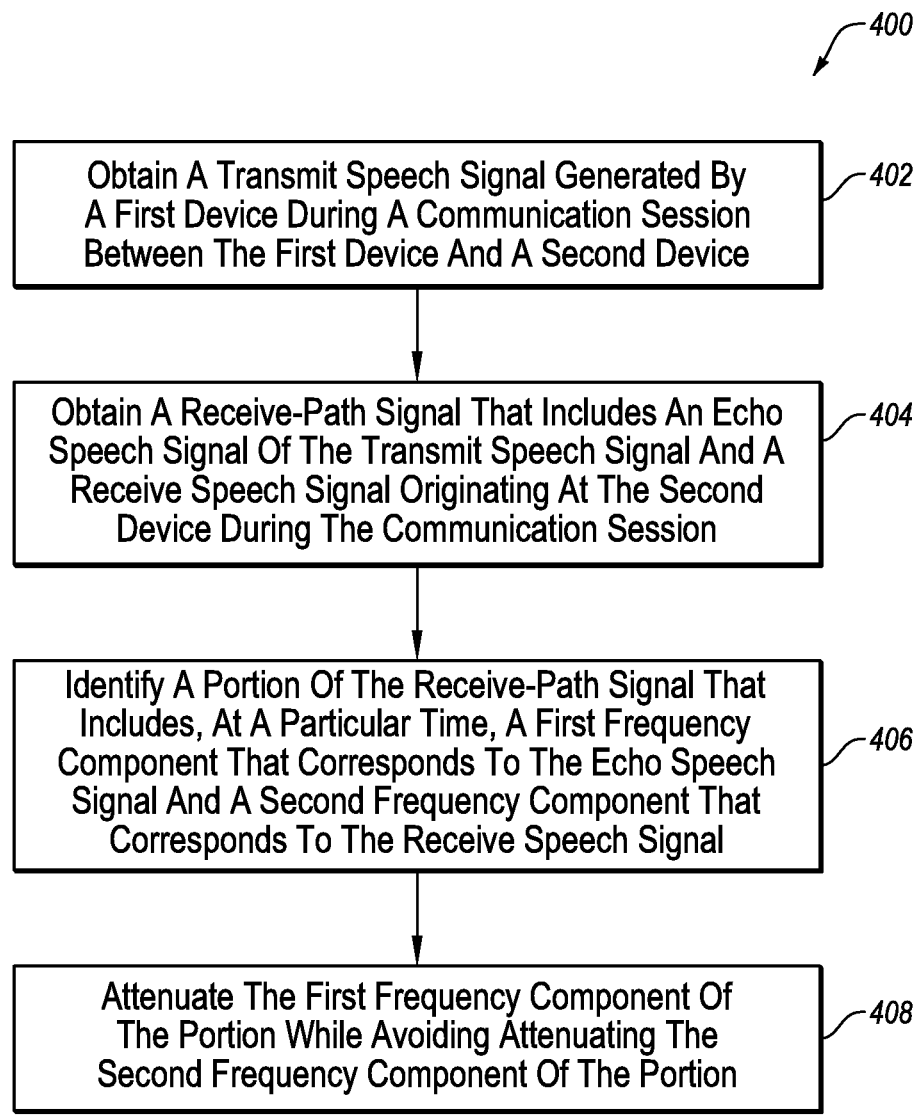
FIG. 4 illustrates a flowchart of an example method of performing gain operations; all in accordance with one or more embodiments of the present disclosure.

FIG. 4 illustrates a flowchart of an example method 400 of performing gain operations. The method 400 may be arranged in accordance with at least one embodiment described in the present disclosure. One or more operations of the method 400 may be performed, in some embodiments, by a device or system, such as the transcription system 130, the first device 104, and/or the second device 106 of FIG. 1, the device 200 of FIG. 2, or the system 300 of FIG. 3, or another device or combination of devices. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 402, where a transmit speech signal may be obtained. The transmit speech signal may be generated by a first device during a communication session between the first device and a second device.

At block 404, a receive-path signal may be obtained. In some instances, the receive-path signal may include an echo speech signal of the transmit speech signal. Additionally or alternatively, the receive-path signal may include a receive speech signal that may originate at the second device during the communication session.

At block 406, a portion of the receive-path signal may be identified. The portion may include, at a particular time, a first frequency component that corresponds to the echo speech signal and a second frequency component that corresponds to the receive speech signal. The first frequency component may be different from the second frequency component in that the first frequency component and the second frequency component may correspond to different frequencies. In these or other embodiments, the portion may be identified based on the portion having the first frequency component and the second frequency component at the particular time and based on the first frequency component and the second frequency component being different from each other.

At block 408, the first frequency component of the portion may be attenuated while avoiding attenuating the second frequency component of the portion. The attenuation of the first frequency component while avoiding attenuating the second frequency component may be performed using one or more filters configured based on the first frequency component and the second frequency component, such as described above. Additionally, the attenuation of the first frequency component while avoiding attenuating the second frequency component may be based on the first frequency component corresponding to the echo speech signal and the second frequency component corresponding to the receive speech signal. In these or other embodiments, the attenuation of the first frequency component may be in response to determining that the echo speech signal at the portion corresponds to voiced speech.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 400 may further include operations related to amplifying the second frequency component of the portion while avoiding amplifying the first frequency component. The amplification of the second frequency component while avoiding amplifying the first frequency component may be based on the second frequency component corresponding to the receive speech signal and the first frequency component corresponding to the echo speech signal.

As another example, in some embodiments, the method 400 may further include operations related to identifying another portion of the receive-path signal that includes, at another particular time, a third frequency component of the echo speech signal and a fourth frequency component of the receive speech signal in which the third frequency component is the same as the fourth frequency component. In these or other embodiments, the method 400 may include avoiding attenuating the other portion of the receive-path signal based on the fourth frequency component being the same as the third frequency component. In these or other embodiments, the method 400 may include avoiding amplifying the other portion of the receive-path signal based on the fourth frequency component being the same as the third frequency component.

As another example, in some embodiments, the method 400 may further include operations related to identifying another portion of the receive-path signal that includes the receive speech signal but that does not include the echo speech signal. In these or other embodiments, the method 400 may include amplifying the other portion of the receive-path signal in response to the other portion including the receive speech signal and not including the echo speech signal. In these or other embodiments, the amplifying of the other portion of the receive-path signal includes amplifying a specific frequency component of the other portion using a filter that is based on the specific frequency component. In these or other embodiments, the amplifying of the specific frequency component may be in response to determining that the receive speech signal at the other portion corresponds to voiced speech that has the specific frequency component.

Additionally or alternatively, the amplifying of the other portion of the receive-path signal may include determining that the receive speech signal at the other portion corresponds to unvoiced speech and identifying a difference between an unvoiced speech frequency spectrum of the unvoiced speech and an estimated noise floor frequency spectrum of the receive-path signal. Additionally or alternatively, the amplifying of the other portion may be in response to determining that the receive speech signal corresponds to unvoiced speech in which the other portion may be amplified based on the difference between the unvoiced speech frequency spectrum and the estimated noise floor frequency spectrum. The amplification based on the difference may be such that frequency components of the other portion that correspond to the unvoiced speech frequency spectrum are amplified more than frequency components of the other portion that correspond to the noise floor frequency spectrum.

As another example, in some embodiments, the method 400 may further include operations related to identifying another portion of the receive-path signal that includes the echo speech signal but that does not include the receive speech signal. In these or other embodiments, the method 400 may further include determining that the echo speech signal at the other portion corresponds to voiced speech and attenuating the other portion of the receive-path signal in response to determining that the echo speech signal corresponds to voiced speech.

As indicated above, the embodiments described herein may include the use of a special purpose or general purpose computer (e.g., the processor 310 of FIG. 3) including various computer hardware or software modules, as discussed in greater detail below. Further, as indicated above, embodiments described herein may be implemented using computer-readable media (e.g., the memory 312 of FIG. 3) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B." For example, the phrase "A or B" should be understood to include the possibilities of "A" or "B" or "A and B" even when the term "and/or" is used elsewhere.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
obtaining a transmit speech signal generated by a first device during a communication session between the first device and a second device;
obtaining a receive-path signal that includes an echo speech signal of the transmit speech signal and a receive speech signal originating at the second device during the communication session;
identifying a first portion of the receive-path signal that occurs at a first time frame and that includes a first frequency component that corresponds to the echo speech signal and a second frequency component that corresponds to the receive speech signal in which the first frequency component is different from the second frequency component;
attenuating the first frequency component of the first portion while avoiding attenuating the second frequency component of the first portion based on the first frequency component corresponding to the echo speech signal and the second frequency component corresponding to the receive speech signal;
identifying a second portion of the receive-path signal that occurs at a second time frame different from the first time frame and that includes a third frequency component of the echo speech signal and a fourth frequency component of the receive speech signal in which the third frequency component is the same as the fourth frequency component; and
avoiding attenuating the second portion of the receive-path signal based on the fourth frequency component being the same as the third frequency component.

2. The method of claim 1, further comprising amplifying the second frequency component of the first portion while avoiding amplifying the first frequency component based on the second frequency component corresponding to the receive speech signal and based on the first frequency component corresponding to the echo speech signal.

3. The method of claim 1, further comprising:
transmitting the transmit speech signal to the second device by way of a communication interface of the first device,
wherein
the obtaining the transmit speech signal includes generating by the first device the transmit speech signal, and
the obtaining the receive-path signal includes receiving, at the communication interface of the first device, the receive-path signal.

4. The method of claim 1, further comprising avoiding amplifying the second portion of the receive-path signal based on the fourth frequency component being the same as the third frequency component.

5. The method of claim 1, wherein attenuating the first frequency component is in response to determining that the echo speech signal at the first portion corresponds to voiced speech.

6. The method of claim 1, further comprising:
identifying another portion of the receive-path signal that includes the receive speech signal but that does not include the echo speech signal; and
amplifying the other portion of the receive-path signal in response to the other portion including the receive speech signal and not including the echo speech signal.

7. The method of claim 6, wherein amplifying the other portion of the receive-path signal includes amplifying a specific frequency component of the other portion using a filter that is based on the specific frequency component in response to determining that the receive speech signal at the other portion corresponds to voiced speech that has the specific frequency component.

8. The method of claim 6, wherein amplifying the other portion of the receive-path signal includes:
determining that the receive speech signal at the other portion corresponds to unvoiced speech;
identifying a difference between an unvoiced speech frequency spectrum of the unvoiced speech and an estimated noise floor frequency spectrum of the receive-path signal; and
amplifying, in response to determining that the receive speech signal at the other portion corresponds to the unvoiced speech, the other portion based on the difference between the unvoiced speech frequency spectrum and the estimated noise floor frequency spectrum such that frequency components of the other portion that correspond to the unvoiced speech frequency spectrum are amplified more than frequency components of the other portion that correspond to the estimated noise floor frequency spectrum.

9. The method of claim 1, further comprising:
identifying another portion of the receive-path signal that includes the echo speech signal but that does not include the receive speech signal;
determining that the echo speech signal at the other portion corresponds to voiced speech; and
attenuating the other portion of the receive-path signal in response to determining that the echo speech signal corresponds to the voiced speech.

10. At least one non-transitory computer-readable media configured to store one or more instructions that, in response to being executed by at least one computing system, cause performance of the method of claim 1.

11. A method comprising:
generating, at a first device, a transmit speech signal during a communication session between the first device and a second device;
transmitting, via a voice network, the transmit speech signal to the second device by way of a communication interface of the first device;
receiving, at the communication interface of the first device, a receive-path signal that includes an echo speech signal of the transmit speech signal and a receive speech signal originating at the second device during the communication session and transmitted over the voice network, the echo speech signal being an echo of the transmit speech signal that results from transmission of the transmit speech signal by way of the communication interface via the voice network;
identifying a portion of the receive-path signal that includes, at a particular time, a first frequency component that corresponds to the echo speech signal and a second frequency component that corresponds to the receive speech signal in which the first frequency component is different from the second frequency component;
attenuating the first frequency component of the portion while avoiding attenuating the second frequency component of the portion based on the first frequency component corresponding to the echo speech signal and the second frequency component corresponding to the receive speech signal, the attenuating of the first frequency component being in response to determining that the echo speech signal corresponds to voiced speech; and
amplifying the second frequency component of the portion while avoiding amplifying the first frequency component based on the second frequency component corresponding to the receive speech signal and based on the first frequency component corresponding to the echo speech signal.

12. The method of claim 11, further comprising:
identifying another portion of the receive-path signal that includes, at another particular time, a third frequency component of the echo speech signal and a fourth frequency component of the receive speech signal in which the third frequency component is the same as the fourth frequency component; and
avoiding attenuating the other portion of the receive-path signal based on the fourth frequency component being the same as the third frequency component.

13. The method of claim 11, further comprising:
identifying another portion of the receive-path signal that includes the receive speech signal but that does not include the echo speech signal; and
amplifying the other portion of the receive-path signal in response to the other portion including the receive speech signal and not including the echo speech signal.

14. The method of claim 13, wherein amplifying the other portion of the receive-path signal includes amplifying a specific frequency component of the other portion using a filter that is based on the specific frequency component in response to determining that the receive speech signal at the other portion corresponds to voiced speech that has the specific frequency component.

15. The method of claim 13, wherein amplifying the other portion of the receive-path signal includes:
determining that the receive speech signal at the other portion corresponds to unvoiced speech;
identifying a difference between an unvoiced speech frequency spectrum of the unvoiced speech and an estimated noise floor frequency spectrum of the receive-path signal; and
amplifying, in response to determining that the receive speech signal at the other portion corresponds to the unvoiced speech, the other portion based on the difference between the unvoiced speech frequency spectrum and the estimated noise floor frequency spectrum such that frequency components of the other portion that correspond to the unvoiced speech frequency spectrum are amplified more than frequency components of the other portion that correspond to the estimated noise floor frequency spectrum.

16. The method of claim 11, further comprising:
identifying another portion of the receive-path signal that includes the echo speech signal but that does not include the receive speech signal;
determining that the echo speech signal at the other portion corresponds to voiced speech; and
attenuating the other portion of the receive-path signal in response to determining that the echo speech signal corresponds to the voiced speech.

17. A system comprising:
one or more processors; and
one or more computer-readable media configured to store instructions that in response to being executed by the one or more processors cause the system to perform operations, the operations comprising:
obtaining a transmit speech signal generated by a first device during a communication session between the first device and a second device;
obtaining a receive-path signal that includes an echo speech signal of the transmit speech signal and a receive speech signal originating at the second device during the communication session;
identifying a first portion of the receive-path signal that occurs at a first time frame and that includes a first frequency component that corresponds to the echo speech signal and a second frequency component that corresponds to the receive speech signal in which the first frequency component is different from the second frequency component;
attenuating the first frequency component of the first portion while avoiding attenuating the second frequency component of the first portion based on the first frequency component corresponding to the echo speech signal and the second frequency component corresponding to the receive speech signal;
identifying a second portion of the receive-path signal that occurs at a second time frame different from the first time frame and that includes a third frequency component of the echo speech signal and a fourth frequency component of the receive speech signal in which the third frequency component is the same as the fourth frequency component; and
avoiding attenuating the second portion of the receive-path signal based on the fourth frequency component being the same as the third frequency component.

18. The system of claim 17, wherein attenuating the first frequency component is in response to determining that the echo speech signal at the first portion corresponds to voiced speech.

19. The system of claim 17, wherein the operations further comprise:
identifying another portion of the receive-path signal that includes the receive speech signal but that does not include the echo speech signal; and
amplifying the other portion of the receive-path signal in response to the other portion including the receive speech signal and not including the echo speech signal.

20. The system of claim 17, wherein the operations further comprise:
identifying another portion of the receive-path signal that includes the echo speech signal but that does not include the receive speech signal;
determining that the echo speech signal at the other portion corresponds to voiced speech; and
attenuating the other portion of the receive-path signal in response to determining that the echo speech signal corresponds to the voiced speech.

* * * * *